United States Patent [19]
Cai

[11] Patent Number: 5,638,740
[45] Date of Patent: Jun. 17, 1997

[54] APPARATUS FOR BREWING ESPRESSO AND CAPPUCCINO

[76] Inventor: Zhihua Cai, 1126 NE. Conser Pl., Corvallis, Oreg. 97330

[21] Appl. No.: 393,699

[22] Filed: Feb. 24, 1995

[51] Int. Cl.$^6$ ............................................. H47J 31/24
[52] U.S. Cl. .............................. 99/295; 99/293; 99/294; 99/323.1; 261/126; 261/DIG. 16; 261/DIG. 76; 426/433
[58] Field of Search ........................ 99/275, 279, 323.1, 99/295, 287, 293, 300, 302 R, 294, 299, 316, 317; 426/433; 261/123, DIG. 16, DIG. 76

[56] References Cited

U.S. PATENT DOCUMENTS

| | | |
|---|---|---|
| 4,644,856 | 2/1987 | Borgmann . |
| 4,660,466 | 4/1987 | Fries et al. . |
| 4,852,474 | 8/1989 | Mahlich ............................ 99/293 |
| 4,882,982 | 11/1989 | Muttoni . |
| 4,945,824 | 8/1990 | Borgmann ................. 261/DIG. 16 |
| 5,089,178 | 2/1992 | Passoni ...................... 261/DIG. 16 |
| 5,127,318 | 7/1992 | Selby . |
| 5,150,645 | 9/1992 | Schiettecatte . |
| 5,154,110 | 10/1992 | Chang . |
| 5,233,915 | 8/1993 | Siccardi ..................... 261/DIG. 16 |
| 5,330,266 | 7/1994 | Stubaus ..................... 261/DIG. 76 |
| 5,340,549 | 8/1994 | Ajinkya ............................ 261/123 |

OTHER PUBLICATIONS

Espresso Makers: Plain and Fancy, Consumer Reports, Nov. 1991 pp. 728–731.

*Primary Examiner*—Robert W. Jenkins

[57] ABSTRACT

An improved espresso/cappuccino machine and methods which comprise a crema device downstream of the coffee filter for producing consistent and rich crema on top of the espresso and an automatic milk frother for producing a predetermined amount of visually appealing foamy head for the milk, both in a manner that is independent of the operators' skill. The crema device comprises an expandable opening for forming a stream or jet of espresso, a crema chamber having keeping means for maintaining an amount of espresso in the chamber during the brewing process, and an arrangement that allows the jet of espresso to plunge directly into the espresso maintained in the chamber thereby producing the crema. The automatic frother comprises an expandable opening for forming a steam jet, an automatic fluid regulating system for selectively introducing air into the frother before the predetermined amount of foamy head has been produced and introducing foam into the frother afterwards, a chamber for mixing the steam with the air and foam, and a reflector for confining the steam above the reflector and preventing the steam from spraying the milk.

65 Claims, 5 Drawing Sheets

APPARATUS FOR BREWING ESPRESSO AND CAPPUCCINO

FIELD OF THE INVENTION

The present invention relates to methods and devices for making espresso, cappuccino, or the like. More particularly, the invention relates to methods and devices for automatically frothing milk and consistently brewing high-quality espresso with a rich foamy head, both in a manner that is independent of the operators' skill.

BACKGROUND OF THE INVENTION

Espresso is a thick, dark coffee with a foamy head or crema and is brewed by forcing hot water under pressure through finely ground coffee. The machines for making espresso can be classified into steam, pump, and piston machines depending on how the pressure is generated. In steam machines, the pressure is generated by steam from boiling water in a sealed reservoir. The espresso made by a steam machine is strong and dark but lacks the body and crema of a good espresso, which is caused by the low steam pressure and high temperature of the water used for brewing.

In pump and piston machines the pressure is generated by an electric pump and a hand-operated piston, respectively. Both the electric pump and hand-operated piston can generate a pressure from 10 to 15 bars, which is much higher than the pressure achievable in a steam machine. One can make a good espresso with pump and piston machines, but only after a lot of practice.

The difficulty in making good espresso with the pump and espresso machines is due to the fact that a lot of variables, such as the fineness and compaction of the coffee grounds in the filter holder, may affect the quality of the espresso. For example, too much compaction or too fine grounds is apt to yield a dark espresso with a thin or no foamy head, whereas too little compaction or too coarse grounds yields a pale, weak coffee with little foam.

Numerous filter holders modified for more consistent espresso are known in the art but have not overcome many of the problems associated with such holders. For example, U.S. Pat. No. 4,882,982 to Spidem shows a filter holder that has pressure control means downstream of the coffee filter for keeping consistent high pressure above the grounds. The pressure control means comprises a narrow orifice as a restrictor to the coffee flow to produce a pilot backpressure, and a shut-off valve located upstream of the restrictor and being piloted by the backpressure. A problem arises with the filter holder of Spidem in that the restrictor and shut-off valve are vulnerable to clogging by foreign matter such as coffee grounds. A second problem with Spidem's filter holder is that it requires high pressure to achieve the foamy head and it is not suitable for steam machine. A third problem with the filter holder as shown in Spidem is that it is complicated and difficult to clean.

Another modified filter holder is shown in U.S. Pat. No. 5,127,318 to Selby. The filter holder as shown in Selby also has a pressure control means for controlling the pressure downstream of the coffee grounds. The pressure control means in Selby's filter holder comprises a pressure regulator valve which allows coffee extraction to pass only after a sufficiently high pressure has been reached. The filter holder of Selby resolves the clogging problem but does not provide solutions to the second and third problems of Spidem. In addition, the regulator valve of Selby's holder stops the coffee flow at a high pressure, which may cause residual hot water and pressure in the holder at the end of a brew cycle.

U.S. Pat. No. 5,150,645 to Schiettecatte shows another modified filter holder which incorporates a mechanism to atomize the coffee extraction to improve the foamy head on espresso. The filter holder as shown in Schiettecatte requires very high pressure to obtain any significant degree of atomization and is not suitable for steam machine. As Spidem's filter holder, Schiettecatte's holder stops the coffee flow at a very high pressure, which may cause residual hot water and pressure in the holder at the end of a brew cycle. Furthermore, the atomization of espresso occurring in Schiettecatte's filter holder will cause rapid evaporation or loss of aroma in the espresso, thus leading to an inferior brew.

Cappuccino is made by adding about one-third espresso into two-thirds milk, or vice versa. Prior to mixing milk with espresso, the milk is frothed with a jet of steam to produce a foamy head and to heat the milk to a desired temperature. The simplest frothing device consists of a steam tube having an orifice at one end for producing the steam jet. The espresso machine operators position the orifice just below the surface of milk and bobs the milk container up and down to inject air into the milk. After enough foam is produced, the steam tube is inserted down into the milk to further heat the milk without producing more foam. Here, experience is crucial to obtain satisfactory results because if you have the nozzle too deeply into the milk there will be no foam, if you have it too shallow it will spray milk all over.

A modified form of the frothing device has an air tube with a first end next to the orifice of the steam tube and a second end far above the surface of milk as disclosed in U.S. Pat. No. 4,945,824 by M. Borgmann. Such a modified device can make air available to the milk near the orifice even if the orifice is immersed in the milk. The air tube is very small at its second end to control the flow of air into the tube. One problem arises with this modified frothing device in that after the milk container is full of foam or after the desired amount of foam has been produced, it is difficult to further heat the milk without producing more foam. Consequently, you may have to either satisfy with a lukewarm milk or suffer a mess caused by milk overflowing. A second problem with this device is that the second end of the air tube is very vulnerable to clogging by milk, dusts, etc., thus making the frothing operation inconsistent and frustrating. A third problem arises with this device in that there are various types of milk and they may require more or less air flow to achieve optimum frothing. The air tube in this modified device, however, can not adjust the air flow through it according to the types of milk. U.S. Pat. No. 4,852,474 to Mahlich and Borgmann shows an improved frothing device or attachment having a valving element at the top end of the air tube for adjusting the air flow. The frothing device of Borgmann et al. resolves some of the problems mentioned above but it may require the operator to adjust the valving element during the frothing process.

Another modified frothing device involves a spinning blade at the end of the steam tube. Steam whirls the blade like a miniature turbine to break air bubbles into smaller ones to stabilize the resulting foam. This method, however, requires the operators to keep moving the milk container downward during frothing process to ensure that the air vent in the blade attachment is just at the surface of the milk.

The present invention provides apparatus having novel and improved means for automatically frothing milk and consistently brewing high-quality espresso with a rich foamy head, both in a manner that is independent of the operators' skill, and is aimed at solving the problems associated with the existing espresso/cappuccino machines.

SUMMARY OF THE INVENTION

In accordance with the present invention, there is provided an apparatus and methods for making coffee, espresso, cappuccino, or the like coffee. The apparatus comprises heating means, preferably electric heater(s), for generating hot water and steam, a coffee filter for receiving a supply of coffee grounds, means for delivering the hot water under pressure through the aforementioned supply of coffee grounds, a crema or foaming device downstream of the filter for producing a consistent and rich crema on top of the espresso, and an automatic milk frother for automatically producing any amount of foamy head desired by the espresso machine operators on the milk.

The crema or foaming device comprises at least one expandable opening formed on a support member for transforming the espresso from the filter into a jet of brewed water, a crema chamber below the expandable opening receiving the jet of brewed water and for maintaining a predetermined amount of espresso in the crema chamber during the brewing process, and an arrangement that allows the jet of brewed water to plunge directly into the brewed water maintained in the crema chamber. The crema chamber includes a bottom, an opening formed a predetermined distance above the bottom, and a restrictive outlet on the bottom. The opening on the crema chamber functions as both an air inlet to the crema chamber and overflow means for the espresso and fine air bubbles in the crema chamber. Very fine air bubbles are generated as the jet of espresso thrusts into the brewed water or espresso maintained in the crema chamber. After being received in a receptacle, the brewed water and fine air bubbles quickly separate into espresso and a layer of rich crema on top of the espresso.

The automatic milk frother comprises an expandable opening for transforming the steam produced by the heating means of the apparatus into a jet of steam, an automatic fluid regulating system for selectively introducing air into the automatic milk frother before the desired amount of foamy head is been produced and introducing foam into the automatic milk frother afterwards, a chamber for allowing the jet of steam to mix with the air and foam, and a reflector for confining the steam above the reflector and preventing the steam from spraying the milk all over. The automatic fluid regulating system comprises a fluid inlet for the air and foam, a fluid passage for providing communication between the fluid inlet and the expandable opening, and positioning means for the espresso machine operators to set the fluid inlet at a predetermined position according to the amount of foamy head desired prior to the frothing operation.

It is an object of the present invention to provide an apparatus for making espresso, cappuccino, or the like.

It is a further object of the present invention to provide a novel device and method for frothing milk or other liquid in an automatic manner so that the quality and quantity of the foamy head as well as the temperature of the frothed milk or other liquid are independent of the operator's skill.

It is a still further object of the present invention to provide a novel device for automatically frothing milk which requires little maintenance and relatively trouble free.

It is a still further object of the present invention to provide a novel device for automatically frothing milk which is easy to clean.

It is a further object of the present invention to provide an apparatus for brewing espresso coffee with a consistent and rich foamy head, in a manner that is independent of the coffee bean grind sizes and the operators' skill.

It is a still further object of the present invention to provide a novel device that can be used with all espresso machines, including steammachines, for producing a consistent and rich foamy head on the espresso.

It is a still further object of the present invention to provide a novel device which can be used to produce foamy head for beverages such as coffee, tea, soft drinks, and alcoholic drinks.

It is a still further object of the present invention to provide an improved steam espresso/cappuccino machine which can provide water having lower temperature and higher pressure than a conventional steammachine for extracting the coffee grounds.

It is a still further object of the present invention to provide a novel device for improving the foamy head of espresso coffee which does not cause residual pressure and water in the filter holder at the end of a brew cycle.

It is a still further object of the present invention to provide a novel device for improving the foamy head of espresso coffee which is easy to clean.

These and other objects and advantages of the present invention will become apparent from the following description of the preferred embodiments, taken together with the accompanying drawings.

DESCRIPTION OF THE DRAWING

The invention may take physical form in certain parts and arrangement of parts, preferred embodiments of which will be described in detail in the specification and illustrated in the accompanying drawings wherein.

DETAILED DESCRIPTION OF THE PREFERRED EMBODIMENTS

Figure 1:
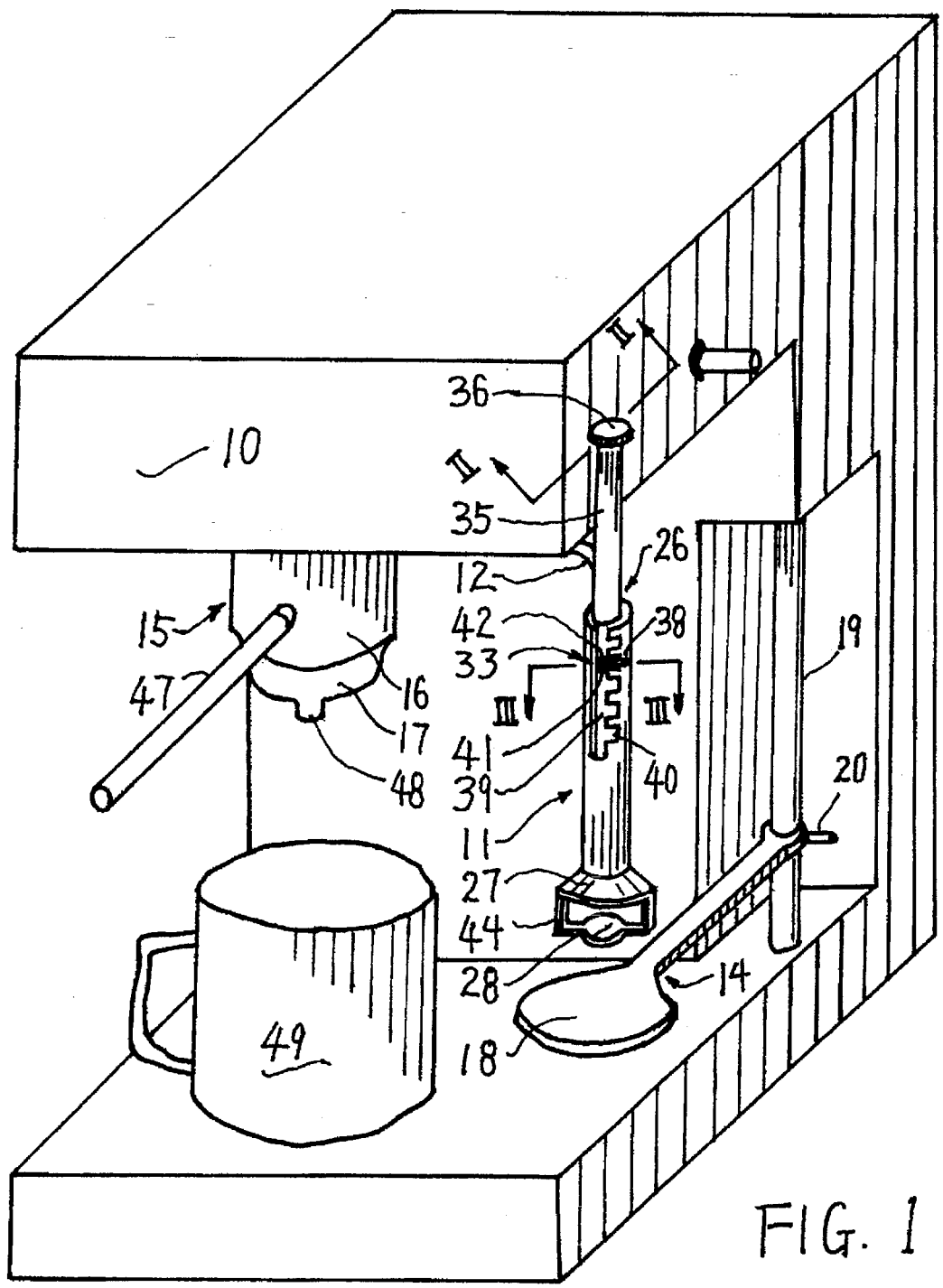
FIG. 1 is a perspective view of an apparatus for making espresso and cappuccino illustrating a preferred embodiment of the present invention.

Referring first to FIG. 1, there is shown an apparatus 10 for making espresso and cappuccino which embodies one form of the present invention. Only those parts of the apparatus are shown which are necessary for full understanding of the invention. For example, the drawings do not show the means for heating water, means for delivering hot water under pressure to coffee grounds, and electrical conductors which connect the electrically operated parts. All such parts which are not specifically shown but necessary in order to render the apparatus fully operative can be similar, analogous or identical to the corresponding parts heretofore conventionally known and used in espresso/cappuccino machines such as steam or pump espresso machines.

Apparatus 10 comprises means for producing a source of pressurized water and a source of pressurized steam (not shown), an automatic milk frothier 11 connected to the source of pressurized steam through a steam tube or conduit 12, a support mechanism 14 for a milk container (not shown), and a filter assembly 15 containing a filter 16 and a crema or foaming device 17 downstream the filter. Support mechanism 14 comprises a support plate 18 which can be moved up and down along a shaft 19 and can be secured in position by lock means such as a bolt 20.

Figure 2:
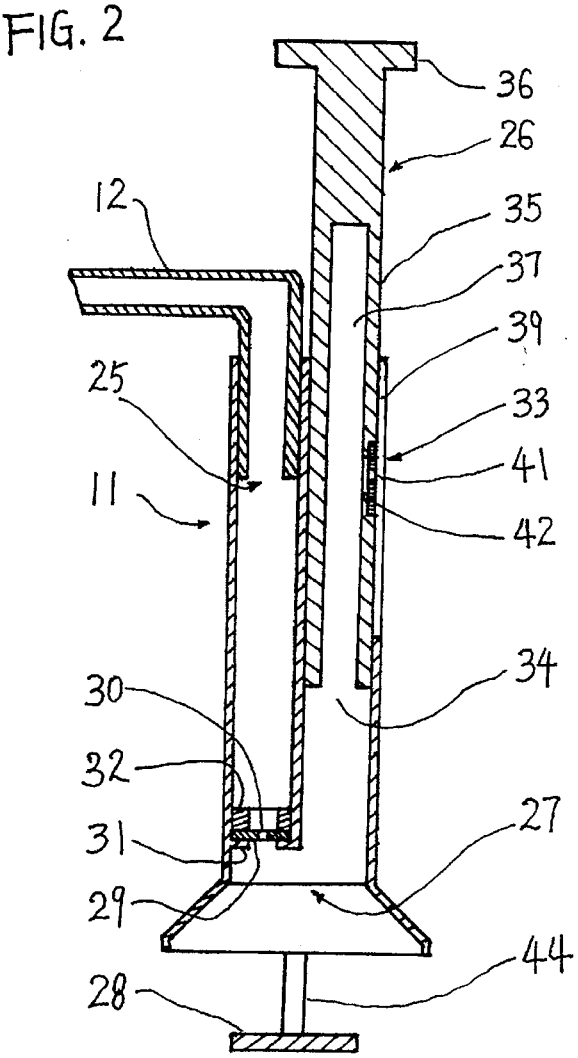
FIG. 2 is a sectioned view of the automatic milk frothier shown in FIG. 1, taken along the line II—II.

Automatic milk frothier 11 comprises a steam inlet 25 connected to the steam tube, an automatic fluid regulating system 26 for selectively introducing air into the automatic milk frothier before the desired amount of foam is produced and introducing foam into the automatic milk frothier after the desired amount of foam has been produced, a chamber 27 located below the steam inlet and the automatic fluid regulating system, as best seen in FIGS. 1 and 2, for allowing the steam to mix with the air and foam prior to entering the milk, and a reflector 28 for confining the steam above the reflector and preventing the steam from spraying the milk all over.

At the lower end of steam inlet 25 is a disc 29 with an opening 30 for transforming the pressurized steam into a jet of steam. The disc is supported on a seating member 31 and secured in position by lock means such as a rigid ring 32. Disc 29 can be made of a rigid or elastic material such as metal, plastic, and rubber. When disc 29 is made of an elastic material, steam pressure may deform the disc thereby causing the opening 30 to expand. Such expandability makes the opening less vulnerable to clogging by solids in milk and steam.

Automatic fluid regulating system 26 includes a fluid inlet 33 for air and foam, a fluid passage 34 for providing communication between the fluid inlet and chamber 27, and positioning means such as a hollow piston 35 for setting the fluid inlet at a predetermined position according to the amount of foamy head desired prior to frothing milk. Hollow piston 35 carries at approximately its middle portion the fluid inlet 33 and fits slidably into fluid passage 34 so that the space between fluid passage 34 and hollow piston 35 is small enough to prevent or hinder air flow through the space. The hollow piston has a handle 36, a conduit 37, and a bar lock 38 next to the fluid inlet. A slot 39 having a number of recesses 40 is formed on the wall of fluid passage 34. The position of fluid inlet 33 can be adjusted by moving hollow piston 35 up and down in the fluid passage 34 through handle 36 and can then be locked by turning bar lock 38 into one of the recesses 40.

An alternative (not shown) to the hollow piston 35 as the positioning means for fluid inlet 33 comprises an enlongable tube carrying at its upper portion the fluid inlet. In this case, the position of the fluid inlet can be raised or lowered by stretching or compressing the enlongable tube, respectively.

The fluid inlet 33 comprises an opening 41 formed on a thin support member 42. The support member can be either formed on hollow piston 35 or attached to the hollow piston. The thickness of support member 42 is from about 0.01 mm to about 5 mm and is preferably smaller than the size of opening 41. It is found that the opening formed on such a thin support member has less chance to retain solid or liquid within the opening, thus rendering it less vulnerable to clogging by milk. Although any materials can be used to construct the support member, elastic materials are slightly preferred since an opening on an elastic member is expandable under vacuum or pressure and thus less vulnerable to clogging.

Reflector 28 is positioned a predetermined distance below the opening 30 and is attached to the lower end of chamber 27 through a connection member 44. Chamber 27 has a larger cross-section area at its lower end than at its upper end, which enables the chamber to contain the steam reflected by reflector 28 and the milk sprayed by the steam.

Figure 4:
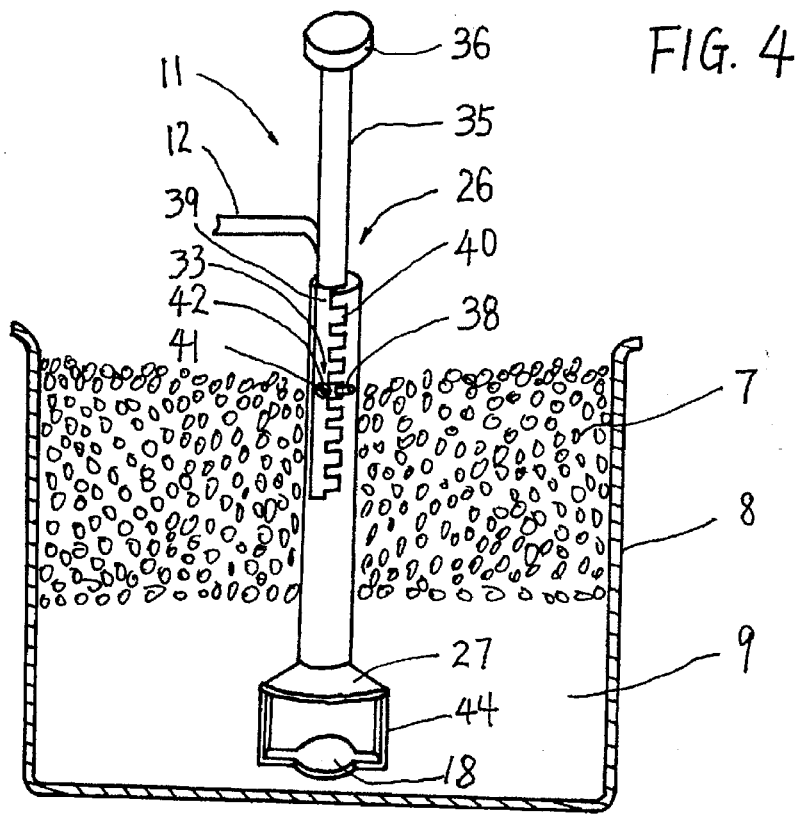
FIG. 4 is a schematic diagram showing the position of the automatic milk frothier of FIG. 1 which is in its perspective view in a milk container which is in its sectioned view at the end of a frothing operation.

To froth milk using the automatic milk frothier disclosed above, pour a desired amount of cold milk into a container and place the container on support plate 18. Move the support plate up until the bottom of the container nearly touches reflector 28, as best seen in FIG. 4, and secure the support plate with bolt 20. Adjust the position of the fluid inlet 33 through handle 36 so that the distance between the fluid inlet and the surface of milk is approximately equal to the thickness of foamy head desired on the milk. (Note: The espresso machine operator does not have to repeat such adjustment in the next frothing operation if similar amount of milk and foam is to be frothed.)

Turn on the steam. A jet of steam is subsequently formed at opening 30. The steam jet brings with it a sheath of air from the automatic fluid regulating system 26 and thrusts into the milk, thus producing foam in the container. The surface of the foam rises as more foam is produced. After the surface of foam reaches fluid inlet 33 as illustrated in FIG. 4, the foam, rather than fresh air, is brought into the automatic fluid regulating system. Since no additional air other than the air trapped in the foam is introduced into the automatic fluid regulating system, the automatic milk frothier regenerates the foam rather than produces additional foam. The regenerated foam usually comprises smaller air bubbles than the original foam, which makes it possible to produce fine air bubbles with a relatively large fluid inlet. In another word, the surface of foam on top of the milk will stay around the fluid inlet rather than keeps rising. In case that the surface of foam falls below the fluid inlet, thus exposing the fluid inlet to fresh air, additional air will be brought into the automatic fluid regulating system. As a result, more foam will be produced until the surface of foam reaches the fluid inlet again.

Obviously, the main effect of the steam is to heat up the milk after the surface of foam on top of the milk reaches the fluid inlet. After a desired milk temperature, which is usually a little below the boiling point, has been reached, some steam may not be able to condense into water the instant when it reaches the milk. Therefore, the surface of foam on the top of the milk will start rising again due to the increased amount of non-condensed steam present in the foam. The operator can then turn off the steam any time before the foam overflows the top of the container.

A unique feature of the automatic milk frothier as disclosed above is that after turning on the steam, the espresso machine operators can leave the automatic milk frothier alone and do whatever else they want to do. Besides giving the espresso machine operators great freedom, such an automatic frothing operation makes the quantity and quality of foam on the top of the frothed milk as well as the milk temperature very consistent and essentially independent of the skill of the operators.

Figure 5:
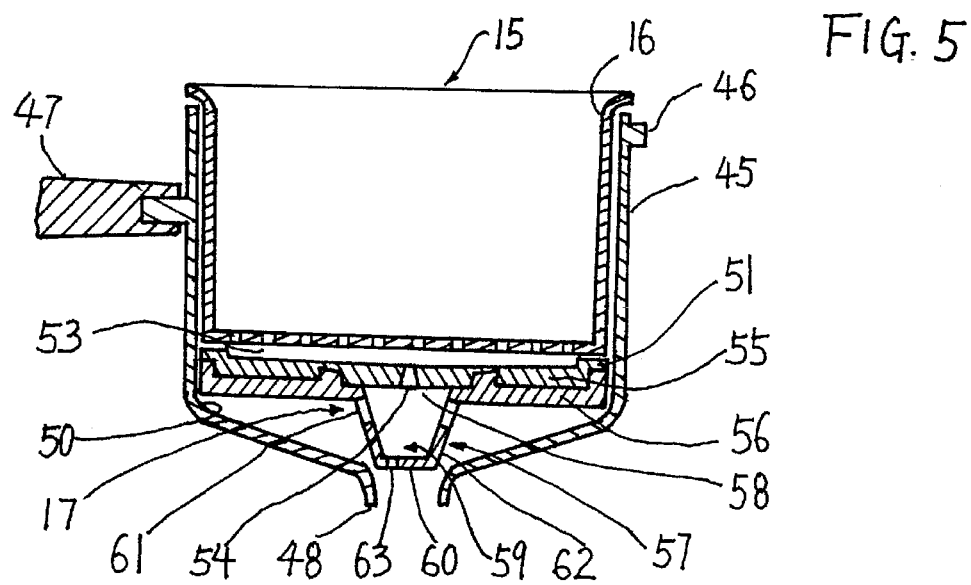
FIG. 5 is a sectioned view of the filter assembly incorporating a filter and a crema device in a filter holder shown in FIG. 1.

Refer now to filter assembly 15 as illustrated in FIGS. 1 and 5, the assembly includes filter 16 for receiving a predetermined amount of ground coffee beans, which filter allows the brewed water to pass while blocking passage of the ground coffee beans, crema or foaming device 17 downstream of the filter for producing fine air bubbles in the brewed water, and a filter holder 45 for receiving the filter and crema device. Filter holder 45 can be separably attached to apparatus 10 by coupling means such as a bayonet lock 46 with the help of a holder handle 47. The brewed water containing the fine air bubbles from crema device 17 is dispensed from an outflow 48 at the bottom of filter holder 45 for collection in at least one receptacle such as a cup 49, where the fine bubbles rises to the top of the espresso, thus forming a rich golden foamy head for the espresso.

Cream device 17 rests against a bottom 50 of filter holder 45 and is designed to be easily inserted into and removed from the filter holder by the espresso machine operators. The filter 16 sits against an annular sealing element 51 on the top of crema device 17 to achieve a sealed relationship between the bottom of the filter and the crema device. A thin space 53 is disposed at the upper end of the crema device as an inlet for receiving the brewed water from the filter.

Crema device 17 comprises an expandable opening 54 formed at about the center of a rubber member 55 for transforming the brewed water from filter 16 into a jet of brewed water. The rubber member is supported at its surrounding area by a support body 56. A crema chamber 57 is disposed below the expandable opening.

The crema chamber includes an inlet port 58 for receiving the jet of brewed water and keeping means 59 for maintaining an amount of brewed water in the crema chamber. The keeping means as shown in FIG. 5 including a bottom 60, an opening 61 formed a predetermined distance above the bottom on side wall 62, and a restrictive outlet 63 formed on the bottom of the crema chamber. Opening 61 does not discharge the brewed water until the brewed water reaches a certain height in the crema chamber. In another word, the brewed water in the crema chamber overflows the opening 61 when it reaches the opening. Opening 61 also functions as an inlet for air to enter the crema chamber.

The size of the restrictive outlet 63 can be either small or relatively large, depending on the desired purpose of the restrictive outlet. If the restrictive outlet 63 is designed as a drain port for draining the residual brewed water in the crema chamber which can not be discharged through opening 61 at the end of a brewing cycle, the restrictive outlet is preferred to be relatively small and more restrictive. In this case, the majority of the brewed water and fine air bubbles in the crema chamber is discharged through opening 61 during the brewing process. If the restrictive outlet 63 is designed as both discharging means for discharging the majority of the brewed water and fine air bubbles during the brewing process and a drain port for draining the residual brewed water in the crema chamber at the end of a brewing cycle, the restrictive outlet is preferred to be relatively large but still restrictive enough to be able to maintain a sufficient amount of brewed water in crema chamber 57 during the brewing process. In the latter case, the flow rate of the brewed water and fine air bubbles through the restrictive outlet increases as the height of the brewed water maintained in the crema chamber increases.

Expandable opening 54 and crema chamber 57 are so arranged that the jet of brewed water can thrust or plunge directly into the brewed water maintained in the crema chamber. As a result, a lot of very fine air bubbles are produced in the brewed water maintained in the crema chamber. The fine air bubbles and brewed water in the crema chamber are discharged through opening 61 and restrictive outlet 63 and finally received in cup 49.

It is important for the crema chamber to maintain the right amount of brewed water during the brewing process. If the amount of brewed water maintained in the crema chamber is not enough, few air bubbles will be generated in the brewed water. If too much brewed water is maintained, the time required to drain the residual brewed water in the crema chamber through the restrictive outlet 63 at the end of a brewing cycle might be too long. In an extreme case, all the brewed water made during a brewing cycle can be contained in the crema chamber if it is large enough, which essentially makes the crema chamber a receptacle for espresso. The amount of brewed water that can be maintained in crema chamber 57 during the brewing process is determined by a number of factors including the amount of air bubbles in the brewed water, the size and shape of the opening 61, the distance between the bottom of the chamber and the opening 61, the size of the restrictive outlet 63, and the volume flow rate of the brewed water into the crema chamber.

It is appreciated that the restrictive outlet 63 can be removed from the crema chamber if a small amount of residual brewed water in the crema chamber at the end of a brewing cycle is not an issue. It is also appreciated that there are other keeping means for maintaining an amount of brewed water in the crema chamber.

Expandable opening 54 is preferably circular, although other shapes such as oval and rectangle are also possible. The size of the expandable opening under zero pressure is critical for the production of fine air bubbles in the crema chamber 57. If the size of expandable opening at zero pressure is too big, very few air bubbles will be produced and the bubbles are usually large and short-lived. If the size of the expandable opening is too small, the pressure drop at the opening will be too high. The desired size of the expandable opening under zero pressure is dependent on factors such as the hardness and thickness of the rubber member 55. Normally, the expandable opening has a diameter of about 0.01 mm to about 3 mm, preferably 0.1 mm to 1 mm.

The expandable opening expands as the volume flow rate of the coffee from filter 16 or the pressure above rubber member 55 increases. The degree of expansion of the expandable opening under a given pressure is determined by factors such as the hardness and thickness of rubber member 55, the central area of the rubber member that is not supported by support body 56, and the shape of the expandable opening.

The expandability of expandable opening 54 serves at least two purposes, to achieve relatively high and stable linear flow rate of the stream or jet of brewed water from the expandable opening and to avoid blockage of the opening by particles or aggregates of particles. Concerning the first purpose, at low volume flow rate of the brewed water from filter 16, the expandable opening remains small, thus causing relatively high linear flow rate of the coffee stream; at high volume flow rate, the expandable opening expands, thus restraining the increase of the linear flow rate. (Note: linear flow rate is the volume flow rate divided by flow area.) Regarding the second purpose, if the expandable opening is blocked by a particle, the pressure above rubber member 55 will keep building up until the expandable opening becomes large enough to allow the particle to pass through.

Figure 6:
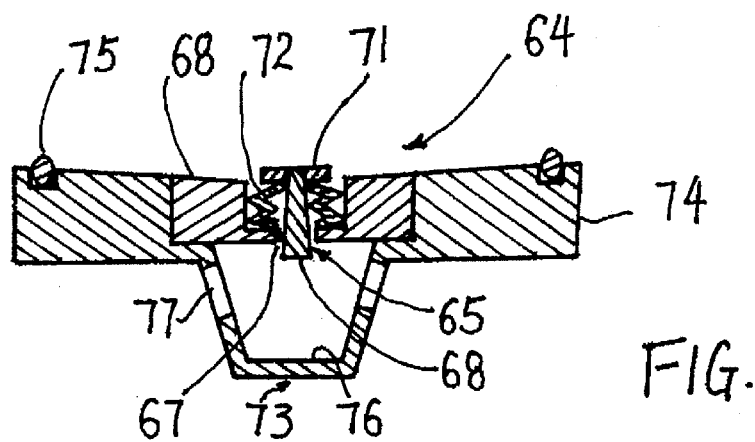
FIG. 6 is a sectioned view of another embodiment of the crema device shown in FIG. 5.

An alternative 64 to crema foaming device 17 of FIG. 5 is shown in FIG. 6. Crema device 64 comprises an expandable opening 65 which is formed by a cylindrical opening 67 located near the center of a support member 68 and a restrictor such as a conical rod 69 within the cylindrical opening. A suitable keeper 71 at the upper end of conical rod 69 retains the rod within the cylindrical opening 67. Normally, the conical rod is urged upwards by a spring 72 so that expandable opening 65 has a predetermined minimal opening size. The expandable opening expands as conical rod 69 is pushed downward within the cylindrical opening by the coffee flow through the expandable opening 65 or the pressure above the conical rod. The degree of expansion of the expandable opening at a given pressure depends on factors such as the strength of spring 72 and diameter of cylindrical opening 67. Such expandability of expandable opening 65 serves the same purposes as the expandable opening 54 of crema device 17.

Support member 68 is positioned on the top of a crema chamber 73 formed on a support body 74. An annular sealing element 75, such as a silicone O-ring, is disposed on the upper surface of the support body to seal against the perforated bottom of a filter (not shown). Crema chamber 73 includes a bottom 76 and opening(s) 77 and serves a similar or identical purpose as the crema chamber 57 of FIG. 5.

In the preferred embodiments disclosed, the crema devices are inserted into and removed from the filter holder as a separate unit. It will be appreciated that the crema device can be attached, either removably or permanently, to the bottom of the filter, to the filter holder, or to anywhere else downstream of the filter. Such attachment, either removable or permanent, allows the operators to not have to insert the crema device into the filter holder as a separate unit every time before making espresso. It will likewise be appreciated that the expandable opening and crema chamber in the crema device can be formed in two separate units. For example, the expandable opening can be formed on a support member which can seal against the bottom of the filter in the filter holder and the crema chamber can be located at or below the outflow 48 of the filter holder. It will also be appreciated that it may be beneficial to have more than one expandable opening for forming the stream or jet of brewed water in a crema device. It will also be appreciated that it is possible to replace the expandable opening in the crema device with a non-expandable opening.

To make espresso using the embodiments disclosed above, coffee grounds is placed into filter 16, but the operators do not have to compact the grounds. A wide range of coffee bean grind sizes can be used without significantly affecting the quantity and quality of the foamy head on the espresso. The filter and crema device are inserted into filter holder 45 and the assembly is then attached to apparatus 10. Water, under the pressure produced by steam, a pump, a piston or other means, is forced through the coffee grounds in filter 16 and forms a stream or jet of brewed water at the expandable opening 54. The jet of brewed water plunges or thrusts into the brewed water or the mixture of brewed water and fine air bubbles maintained in crema chamber 57, thus producing in the crema chamber very fine air bubbles. The brewed water and fine air bubbles overflows the opening(s) 61 on crema chamber 57 and are subsequently dispensed through outflow 48 into cup 49. In the cup the fine air bubbles quickly rises to the surface of coffee and forms a foamy head or crema with an attractive rich golden color.

To investigate how the crema device 17 performs under some of the most unfavorable conditions for the generation of foamy head or crema, two of the lowest quality ground coffees which were originally intended for automatic drip coffeemakers and two of the cheapest coffee beans were used to brew espresso. The coffee beans were ground to a relatively coarse size suitable for automatic drip coffeemakers rather than for espresso machines and stored in a paper bag for over one month prior to using. (Note: To obtain espresso with any significant amount of foamy head using a conventional pump or piston espresso/cappuccino machine without the crema device 17, the coffee grounds used must be much finer than the grounds for automatic drip coffee.) The ground coffee was placed in filter 16 without any compacting. The filter 16 and crema device 17 were inserted into filter holder 45 and the assembly was then attached to either a conventional pump or steam espresso/cappuccino machine. A consistent and rich foamy head was always obtained on the espressos no matter which machine (the steam or pump machine) and which coffee grounds were used. In the control experiments where the crema device was not used, the resulting espressos brewed by both the pump and steam espresso/cappuccino machines had little or no foamy head.

Figure 7:
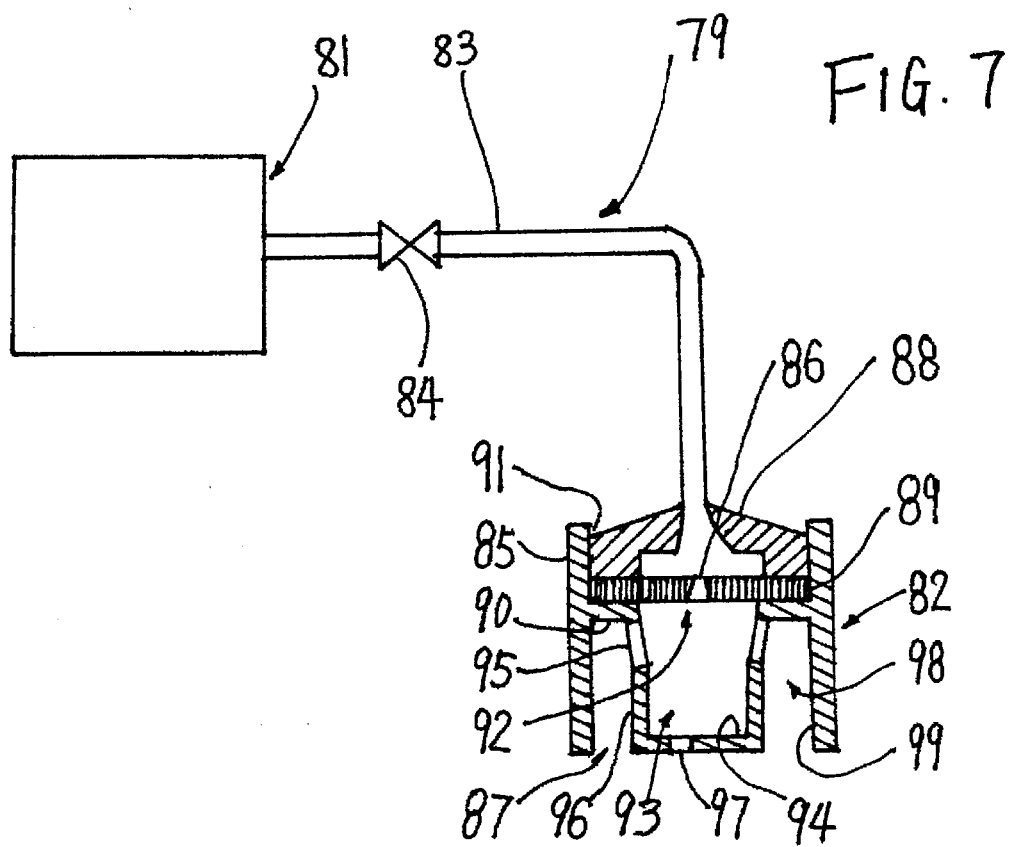
FIG. 7 is a schematic diagram of another exemplary apparatus for producing foamy head on a beverage, showing a source of pressurized beverage and a crema device.

FIG. 7 illustrates a more general application of the crema devices disclosed above. A system 79 for producing a visually appealing, long-lasting foamy head on top of a drink comprises a source of pressurized drink (either hot or cold) 81 and a crema device 82. The pressurized drink such as coffee, tea, and soft drinks in source 81 is introduced into crema device 82 through conveying means such as a pressure tube 83 with valve means 84 for controlling the flow of the drink. The Crema device comprises a generally cylindrical body 85, an expandable opening 86 for transforming the pressurized drink into a drink jet, a crema chamber 87 formed near the center of the body, and a cap 88.

Expandable opening 86 is formed near the center of a rubber member 89. The rubber member is located above crema chamber 87 and secured in position between a seating member 90 and cap 88 via locking means such as thread 91. The expandable opening 86 has similar characteristics and serves similar purposes as the expandable openings 54 and 65 discussed earlier.

Crema chamber 87 has an inlet port 92 for receiving the drink jet and keeping means 93 for maintaining an amount of drink in the crema chamber during the process of producing foam in the drink. The keeping means as shown in FIG. 7 comprises a bottom 94, opening(s) 95 formed a predetermined distance above the bottom on side wall 96, and a restrictive outlet 97 on the bottom 94. Opening(s) 95 does not discharge the drink until the drink has reached a certain height in the crema chamber.

The expandable opening 86 and crema chamber 87 are arranged in such a way that the drink jet plunges directly into the drink maintained in the crema chamber. Very fine air bubbles are produced as the drink jet plunges into the drink maintained in the crema chamber. Opening(s) 95 functions as both overflow means for the fine air bubbles and drink in the crema chamber and an inlet for air. The drink and fine air bubbles from the opening(s) 95 enter a dispensing channel 98 formed between side wall 96 and an outer wall 99 at the lower portion of body 85.

Figure 8:
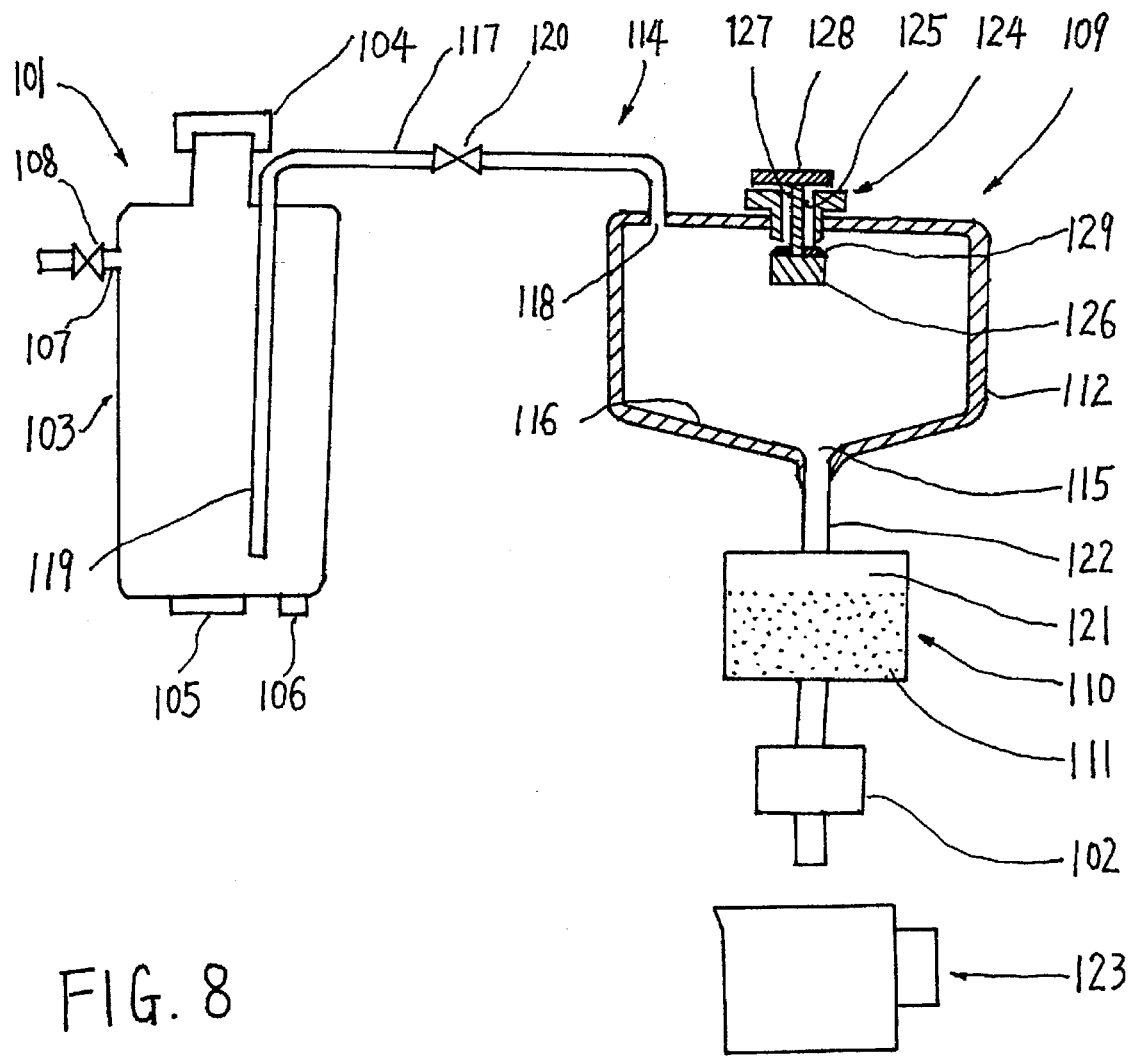
FIG. 8 is a schematic diagram showing the constitution of another exemplary apparatus for making espresso and cappuccino according to the present invention.

FIG. 8 shows a modified steam espresso/cappuccino machine 101 in connection with a device 102, such as the above mentioned crema device, for producing a foamy head for the espresso from the steam espresso/cappuccino machine. The machine comprises a vessel 103 for receiving a supply of water. The vessel 103 can be sealed off by a removable lid 104. An electrical heating element 105 is attached to the vessel for heating the water therein and is controlled by thermostat 106, which turns off the heating element at a predetermined temperature. A steam tube 107 is connected to the upper end of vessel 103 for introducing steam from the vessel to a frothing device (not shown), such as the automatic milk frothier as disclosed above, for frothing milk. A steam valve 108 is provided in the steam tube for adjusting the flow of steam.

A hot water storing means 109 is provided between a container 110 that contains a supply of ground coffee beans 111 and the vessel 103 for adjusting the temperature and pressure of the water used for extracting the ground coffee beans. The hot water storing means comprises a chamber 112, transferring means 114 for transferring the water in the vessel to the chamber after the water has been heated up to a predetermined temperature by heating element 105, and an outlet 115 disposed at a bottom 116 of the chamber. Generally the chamber has approximately 70% to 90% of the capacity of vessel 103, although in principle the chamber can be either larger or smaller than the vessel.

The transferring means comprises a L-shaped tube 117 which has a first end 118 connected to the upper end of the chamber and a second end 119 disposed a predetermined distance above the bottom of the vessel 103. The predetermined distance allows a sufficient amount of water to be maintained in the vessel for the generation of steam. The tube 117 starts to transfer the water to chamber 112 as the average temperature of the water in vessel 103 approaches a predetermined value, at which value the pressure above the water in the vessel is a little above atmospheric pressure.

This predetermined value for the average temperature in the vessel 103 is controlled by factors such as the position of heating element 105, the heat conductivity of water, the construction of the vessel, and the distance between the surface of water in the vessel and the highest point in tube 117. Due to the poor heat conductivity of water and steam, the pressure above the water in the vessel could reach more than 1 atmosphere before the average temperature of the water in the vessel reaches 100° C. The average temperature of water in vessel 103 at which the transferring means 114 starts to transfer the water to chamber 112 ranges from about 85° C. to about 105° C., preferentially from about 90° C. to about 102° C.

Figure 3:
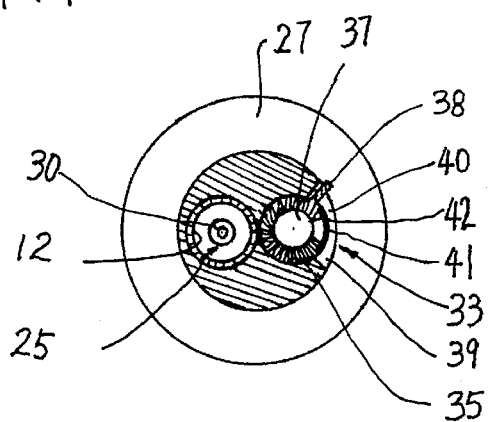
FIG. 3 is a plan view of the automatic milk frothier shown in FIG. 1, taken along line III—III.

A brew/steam switch 120 is provided in tube 117 for opening the tube when espresso is to be brewed and for closing the tube when milk is to be frothed. The outlet port 115 of chamber 112 is connected to a brewing chamber 121 in container 110 via a connection tube 122. The ground coffee beans 111 is placed in a filter (not shown in FIG. 8) at the lower portion of the brewing chamber. The device 102, such as the crema device of FIG. 2, 3, or 7, is placed downstream of the filter for producing fine air bubbles in the brewed water. The brewed water with fine air bubbles is collected in a cup 123, where the fine air bubbles quickly rise to form a foamy head on the espresso coffee.

An automatic air releasing valve 124 is attached to the top of chamber 112. Valve 124 comprises a channel 125 as the passage for air and steam a float 126 for opening and closing the channel, and a stem 127 passing through the channel and bearing at its lower end the float and at its upper end a keeper 128 for keeping the float from dropping. A rubber member 129 is mounted on the top of float 126 for achieving an air-tight sealing between the bottom of channel 125 and the float when the float rises due to buoyancy in water.

To make an espresso coffee, the vessel 103 is filled with water up to a limit located below the entrance to steam tube 107 and then sealed with removable lid 104. Steam valve 108 is closed while brew/steam switch 120 open. After the water in vessel 103 is heated up to a predetermined temperature, the hot water is transferred to chamber 112 through transferring means 114. At the same time, the air in the chamber exits through channel 125 to maintain the atmosphere pressure in the chamber. When the water level in the chamber reaches float 126, the float rises due to buoyancy and closes the channel 125. Subsequently, the pressure in vessel 103 builds up very quickly since the amount of water remaining in the vessel is small and can be heated up very quickly. The high pressure forces the water in the chamber, which water has a temperature of about 95° C. to 102° C., through the ground coffee beans 111 and device 102, thus producing an espresso with a desired foaming head and temperature.

The scope of the invention is obviously not restricted to the embodiments described by way of examples and depicted in the drawings, there being numerous changes, modifications, additions, and applications thereof imaginable within the purview of the claims.

What is claimed is:

1. An apparatus for brewing coffee, espresso, cappuccino or the like comprising:
    means for generating pressurized water;
    a filter for receiving a supply of ground coffee beans, said filter allowing pressurized brewed water to pass while blocking passage of said ground coffee beans; and
    foaming means disposed downstream of said filter for producing fine air bubbles or foam for said brewed water, said foaming means comprising an inlet for receiving said pressurized brewed water, transforming means for transforming said pressurized brewed water into at least one jet of brewed water, containing means having an inlet port for receiving said jet of brewed water and keeping means for maintaining an amount of brewed water in said containing means during the brewing process, and an arrangement that allows said jet of brewed water to plunge into the brewed water maintained in said containing means thereby producing in said brewed water very fine air bubbles.

2. An apparatus as defined in claim 1 further comprising at least one receptacle for receiving said brewed water and said fine air bubbles from said containing means, in said receptacle said fine air bubbles quickly rising to the surface of said brewed water to form a thick long-lived foamy head.

3. An apparatus as defined in claim 1 wherein said transforming means comprises a support member having at least one opening.

4. An apparatus as defined in claim 3 wherein said support member is an elastic member or a rubber member, said rubber or elastic member being able to deform under the pressure or the volume flow of said brewed water thereby causing said opening to expand.

5. An apparatus as defined in claim 3 wherein said transforming means further comprises a restrictor in said opening, said restrictor being able to respond to the pressure or the volume flow of said brewed water so as to adjust the actual size of said opening.

6. An apparatus as defined in claim 1 wherein said keeping means comprises overflow means for said brewed water and said fine air bubbles to flow out of said containing means when said fine air bubbles and said brewed water reach a certain height in said means.

7. An apparatus as defined in claim 6 wherein said keeping means further comprises a drain port at about the lowest portion in said containing means for draining said brewed water in said containing means at the end of a brewing cycle.

8. An apparatus as defined in claim 1 wherein said keeping means comprises a restricted outlet for said fine air bubbles and brewed water in said containing means, said restrictive outlet being restrictive or resistive to fluid flow so that a layer of said brewed water can remain in said containing means during the brewing process.

9. An apparatus as defined in claim 1 wherein said foaming means further comprises inlet means for allowing air to enter said containing means.

10. An apparatus as defined in claim 1 wherein said means for generating pressurized water comprises a pump.

11. An apparatus as defined in claim 1 wherein said means for generating pressurized water comprises heating means for heating water over its boiling temperature.

12. An apparatus for making beverages such as coffee, espresso, cappuccino, tea, cocoa, or the like comprising:

means for generating pressurized water;

a filter arranged to receive a supply of ground coffee beans, tea or the like, said filter allowing said pressurized water to pass while blocking passage of said ground coffee beans or the like;

transforming means for transforming said pressurized water from said filter into at least one jet of brewed water;

containing means comprising an inlet port for receiving said jet of brewed water and keeping means for maintaining an amount of brewed water in said containing means during the process of making said beverage; and an arrangement that allows said jet of brewed water to plunge into the brewed water maintained in said containing means thereby producing in said brewed water fine air bubbles, said fine air bubbles having a tendency to ascend and to form a foamy head.

13. An apparatus as defined in claim 12 wherein said containing means is a chamber.

14. An apparatus as defined in claim 12 wherein said keeping means includes overflow means for said brewed water and said fine air bubbles to flow out of said containing means when said brewed water and fine air bubbles reach a certain height in said containing means.

15. An apparatus as defined in claim 12 wherein said keeping means comprises draining means for draining said brewed water in said containing means at the end of a brewing cycle.

16. An apparatus as defined in claim 12 wherein said keeping means comprises a restrictive outlet for said fine air bubbles and brewed water in said containing means, said restrictive outlet being restrictive or resistive to fluid flow so that a layer of said brewed water can remain in said containing means during the brewing process.

17. An apparatus as defined in claim 12 wherein said transforming means comprises a support member having at least one opening.

18. An apparatus as defined in claim 17 wherein said opening is an expandable opening which is able to expand or increase in size as the pressure or the volume flow rate of said brewed water increases.

19. An apparatus as defined in claim 12 wherein said containing means is a receptacle, said receptacle having a capacity to contain at least one cup of said beverage.

20. An apparatus as defined in claim 12 further comprising a supply of air available to said jet of brewed water.

21. A device for producing a visually appealing foamy head on top of a drink comprising:

an inlet adapted to connect to a source of pressurized drink;

transforming means for transforming said pressurized drink into at least one drink jet;

containing means having an inlet port for receiving said drink jet and keeping means for maintaining an amount of drink in said containing means;

a supply of air available to said drink jet;

an arrangement for directing said drink jet into the drink maintained in said containing means thereby generating fine air bubbles in said drink; and dispensing means for dispensing said drink and said fine air bubbles from said containing means, said fine air bubbles tending to ascend to the surface of said drink thereby forming on top of said drink a visually appealing, long-lived foamy head.

22. A device as defined in claim 21 wherein said transforming means comprises a support member having at least one opening.

23. A device as defined in claim 22 wherein said support member is an elastic member or a rubber member, said rubber or elastic member being able to deform under the pressure or volume flow rate of said drink thereby making said opening expandable and less vulnerable to clogging by solids.

24. A device as defined in claim 22 wherein said transforming means further comprises a restrictor in said opening, said restrictor being able to respond to the pressure of said pressurized drink thereby adjusting the actual size of said opening to avoid clogging of said opening by solids such as coffee grounds.

25. A device as defined in claim 21 wherein said supply of air comprises the air outside said containing means, said air entering said containing means through inlet means disposed a predetermined distance above the lowest portion of said containing means.

26. A device as defined in claim 21 wherein said keeping means comprises overflow means for said drink and said fine air bubbles to flow out of said containing means when said fine air bubbles and drink reach a certain height in said containing means.

27. A device as defined in claim 21 wherein said keeping means further comprises draining means for draining said drink in said containing means at the end of a process for producing said foamy head.

28. A device as defined in claim 21 wherein said keeping means comprises a restrictive outlet for said fine air bubbles and drink in said containing means, said restrictive outlet being restrictive or resistive to fluid flow so that a layer of said drink can be maintained in said containing means during the foam producing process.

29. An apparatus for making espresso, cappuccino, or the like comprising:

a vessel for receiving a supply of water, said vessel having a removable lid;

heating means for heating said supply of water and generating steam in said vessel;

a container for receiving an amount of ground coffee beans or the like;

storing means located upstream of said container for temporarily storing the heated water from said vessel, said storing means comprising an inlet for receiving said heated water, a chamber for holding said heated water, and an outlet in communication with said container for introducing said heated water temporarily stored in said chamber to said ground coffee beans; and transferring means for transferring said supply of water from said vessel to said storing means after said supply of water in said vessel has been heated up to a predetermined temperature by said heating means.

30. An apparatus as defined in claim 29 further comprising means for producing a foamy head on the top of said espresso.

31. An apparatus as defined in claim 30 wherein said means comprises inlet means for receiving the brewed water from said ground coffee beans or the like, transforming means for transforming said brewed water into at least one jet of brewed water, containing means having an inlet for receiving said jet of brewed water and keeping means for maintaining an amount of said brewed water in said containing means, and an arrangement that allows said jet of brewed water to plunge into the brewed water maintained in said chamber thereby producing in said brewed water very fine air bubbles.

32. An apparatus as defined in claim 29 wherein said storing means further comprises an automatic air relief valve which opens said chamber for releasing the air therein before a predetermined amount of water is transferred from said vessel to said chamber and closes said chamber after said predetermined amount of water has been transferred.

33. An apparatus as defined in claim 32 wherein said automatic air relief valve comprises an air outlet and a float below said outlet, said float being able to move between a first position, in which said float opens said outlet, and a second position, which said float closes said outlet.

34. An apparatus as defined in claim 29 wherein said transferring means comprises a rising pipe, one end of which is disposed a predetermined distance above the lowest portion of said vessel and the other end of which is connected to said storing means.

35. An apparatus as defined in claim 29 wherein said predetermined temperature is about 85° C. to about 110° C., preferentially about 95° C. to about 102° C.

36. An apparatus as defined in claim 29 wherein said vessel and said heating means are so constructed that a portion of said supply of water in said vessel can reach above the boiling temperature before the rest of said supply of water.

37. A device for utilizing the steam generated by apparatus such as an espresso/cappuccino machine and delivered to said device through a steam conduit to produce a visually appealing foamy head on milk or other liquid in a container in an essentially automatic, fashion comprising:

a steam inlet for receiving said steam, said steam inlet being adapted to connect or attach to the steam conduit;
   regulating means comprising a fluid inlet for fluid such as air and foam, a fluid passage for providing communication between said fluid inlet and said steam inlet so that said steam from said steam inlet can draw said air from said fluid inlet by way of said fluid passage, and positioning means for the operators of said device to set said fluid inlet at a position a certain distance above the surface of said milk or other liquid, said regulating means introducing air into said fluid passage when the foamy head in the vicinity of said device in said container is below or away from said fluid inlet and introducing foam into said fluid passage when said foamy head reaches or covers said fluid inlet; and
   a chamber for mixing said steam from said steam inlet and said air and said foam from said fluid inlet, said steam carrying said air and injecting into said milk or other liquid thereby producing said foamy head on said milk or other liquid.

38. A device as defined in claim 37 further comprising transforming means for transforming said steam into at least one jet of steam, said transforming means comprises a support member having at least one opening.

39. A device as defined in claim 38 wherein said support member is an elastic member such as a rubber member, said elastic member being able to deform under pressure or force thereby making said opening expandable and less vulnerable to obstructing by solids.

40. A device as defined in claim 38 wherein said transforming means further comprises a restrictor in said opening, said restrictor being able to respond to the pressure of said pressurized steam thereby adjusting the actual size of said opening to avoid clogging of said opening by solid particles or deposit.

41. A device as defined in claim 37 wherein said positioning means comprises a movable member which carries said fluid inlet, said movable member being adapted to be moved up or down by the operator or user of said device, thereby allowing the position of said fluid inlet to be adjusted by said operator.

42. A device as defined in claim 41 wherein said movable member is a sliding member which fits slidably to said fluid passage.

43. A device as defined in claim 41 wherein said positioning means further comprises holding means for holding said movable member in place thereby preventing said movable member from falling down on its own weight after said operator has adjusted the position of said fluid inlet.

44. A device as defined in claim 41 wherein movable member is a compressible member, said compressible member allowing the position of said fluid inlet to be raised by elongating or stretching said compressible member and to be lowered by compressing or pressing said compressible member.

45. A device as defined in claim 37 wherein said fluid inlet comprises a support member having at least one opening.

46. A device as defined in claim 45 wherein said support member has a thickness which is approximately equal to, preferentially smaller than, the size of said opening thereby making it difficult for any solid and liquid to stay in or obstruct said opening.

47. A device as defined in claim 45 wherein said support member is an elastic member, said elastic member being able to deform under vacuum or force thereby making said opening expandable and less vulnerable to obstructing by solid and liquid.

48. A device as defined in claim 37 further comprising a support member for holding said container for said milk or other liquid during the frothing process.

49. A device as defined in claim 48 further comprising an adjusting mechanism for adjusting the height and position of said support member on which said container rests during the frothing process.

50. A device as defined in claim 37 further comprising a reflector disposed a predetermined distance below said chamber for confining said steam above said reflector and preventing said steam from spraying said milk all over.

51. A device as defined in claim 37 wherein said positioning means further comprises prevention means for preventing or hindering any fluid flow other than the fluid flow from said fluid inlet from entering said fluid passage.

52. A method for automatically producing a foamy head on top of a liquid such as milk comprising:

pouring an amount of said liquid such as milk into a container;
   adjusting the relative position of said container and a frothing device so that part of said device is below the surface of said liquid in said container, said device comprising a steam inlet for receiving steam, a fluid inlet for fluid such as air and foam, and a fluid passage for providing communication between said fluid inlet and said steam inlet, the position of said fluid inlet being adjustable;
   setting said fluid inlet at a position a certain distance above the surface of said liquid or the bottom of said container, said distance approximately determining the amount of foamy head to be produced on said liquid in said container;

turning on said steam to said device, wherein said steam from said steam inlet carries said air from said fluid inlet and injects into said liquid thereby producing said foamy head and heating said liquid in said container, the amount of said foamy head continuing to increase rapidly until said foamy head reaches or covers said fluid inlet; and turning off said steam to said device after the amount of said foamy head in said container starts to increase rapidly again.

53. The method of claim 52, wherein the position of said fluid inlet can be set before adjusting the relative position of said container and said device.

54. The method of claim 52, wherein said container rests on a support during the process of producing said foamy head in said container.

55. The method of claim 54, wherein the relative position of said container and frothing device being adjusted by adjusting the position of said support on which said container rests.

56. The method of claim 52, wherein said steam to said device is turned on and off through a flow valve.

57. The method of claim 52, wherein the position of said fluid inlet can be reset during the process of frothing said milk if the amount of foamy head to be produced or desired by the operators changes.

58. The method of claim 52, wherein the position of said fluid inlet can be kept the same for future frothing operations if the amount of foamy head to be produced or desired by the operators remains approximately the same.

59. The method of claim 52 further comprising a step of washing said device by immersing said device including said fluid inlet into water and then turning on said pressurized steam.

60. A method of using a device for the automatic production of foam on the top of a liquid such as milk comprising an inlet for receiving steam, a fluid inlet for fluid such as air and said foam, and a fluid passage for providing communication between said fluid inlet and steam inlet, the position of said fluid inlet being adjustable, said method comprising:

pouring an amount of said liquid such as milk into a container;

adjusting the position of said device or said container so that said device is partially immersed in said liquid;

setting said fluid inlet at a position a certain distance above the upper surface of said liquid, said distance approximately defining the amount of foam to be produced on the top of said liquid;

turning on said steam to said device, wherein said steam from said steam inlet carries said air from said fluid inlet and injects into said liquid such as milk thereby producing said foam on top of said liquid in said container; and turning off said steam after the upper surface of said foam in the vicinity of said device said container goes above said fluid inlet.

61. The method of claim 60, wherein said container rests on a support during the process of producing said foam on the top of said liquid such as milk.

62. The method of claim 60, wherein the position of said fluid inlet an be reset during the process of frothing said liquid if the amount of foam to be produced or desired by the operators changes.

63. The method of claim 62 further comprising a step of washing said device by immersing said device including said fluid inlet into water.

64. The method of claim 60, wherein the position of said fluid inlet can be set before adjusting the position of said device or said container.

65. The method of claim 60, wherein the position of said fluid inlet can be kept the same for future frothing operations if the amount of foam and forthed milk to be produced or desired by the operators or users of said device remains approximately the same.

* * * * *